Dec. 3, 1963 C. L. KLAGES ETAL 3,112,659
INTERCHANGEABLE HEAD BORING BAR
Filed May 25, 1960
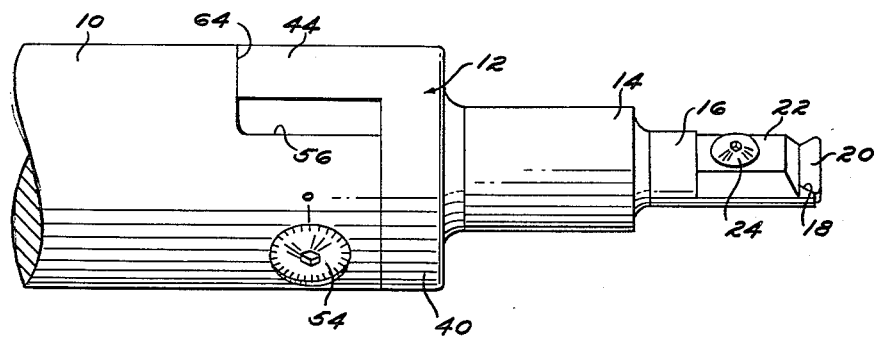
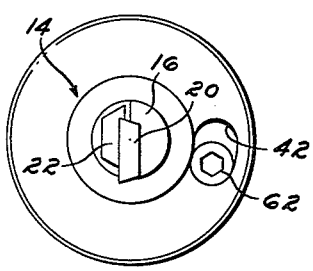
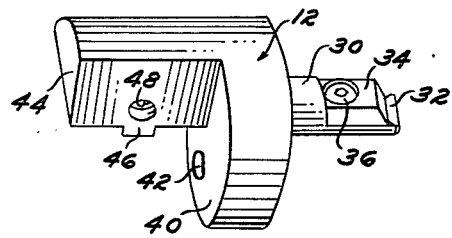
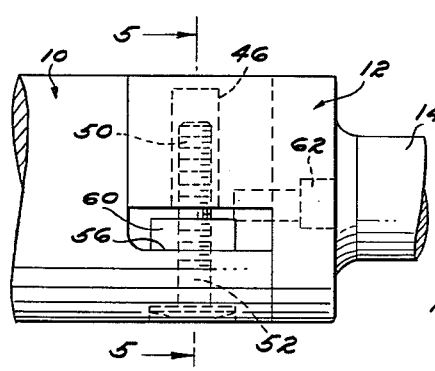
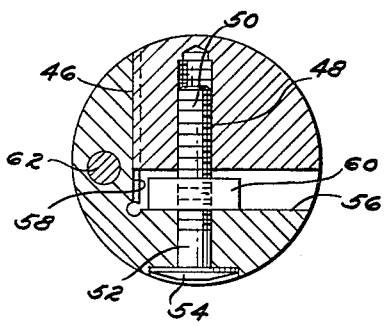
INVENTORS
CHRISTIAN L. KLAGES
HENRY E. KONOPKA
BY
Barnes, Kisselle, Raisch
& Choate
ATTORNEYS

3,112,659
INTERCHANGEABLE HEAD BORING BAR
Christian L. Klages, Brighton, Mich., and Henry E. Konopka, Oakland, N.J., assignors, by mesne assignments, to Wesson Corporation, Ferndale, Mich., a corporation of Delaware
Filed May 25, 1960, Ser. No. 31,759
3 Claims. (Cl. 77—58)

This invention relates to an interchangeable head boring bar designed for the utilization of throwaway carbide inserts.

It is an object of the invention to provide a new concept in the use of boring bars for the finishing of small holes. In the first place, it is important that these boring bars be subject to a very fine adjustment and also that a single shank can utilize several different sizes of boring bar to render the tool versatile in its application.

It is a further object to provide a boring bar with a replaceable head which accurately and solidly locates the head on the boring bar while permitting radial adjustment.

It is still a further object to provide a boring bar which solidly clamps a replaceable insert.

Other objects and features of the invention relating to details of construction and operation will be apparent in the following description and claims.

Drawings accompany the disclosure and the various views thereof may be briefly described as:

FIGURE 1, a view of an assembled boring bar.

FIGURE 2, an end view of the boring bar shown in FIGURE 1.

FIGURE 3, a view of a boring bar having a fastening base similar to that shown in FIGURE 1 with a different head unit.

FIGURE 4, a detailed plan view of the boring bar mechanism particularly in the uniting area between the head and the bar.

FIGURE 5, a sectional view on line 5—5 of FIGURE 4.

Referring to the drawings:

The boring bar comprises a shank or main bar 10 and a replaceable head unit comprising an interfitting body portion 12 and a bore head element 14. The boring bar element has a cylindrical projecting portion 16 provided with a recess 18 for receiving an insert of carbide material 20 held in place by a clamp 22 secured by a bolt 24.

In FIGURE 3 a similar body portion 12 is shown with a shorter and smaller boring head portion 30 having an insert 32 and clamp 34 and a holding screw 36. As shown in FIGURE 3, the body portion 12 comprises a cylindrical disc 40 having in the outer portion thereof an elongated slot 42. At one segmental portion of the disc 40 is a segmental extension 44 which has on one flat chordal surface thereof a rib 46. Just above the rib is a tapped hole 48 which receives a threaded shank 50 of a micro screw 52, having an adjustment head 54 recessed in the wall of the bar 10. The bar 10 is also provided with a segmental opening 56 which has a slot 58 for slidably receiving the rib 46. A collar 60 is provided around the shank of the screw 52 to serve as a locator and stop. A locking screw 62 passes through the elongated slot 42 into the shank of the boring bar to clamp the head securely on the shank. It will be noted that the disc portion 40 overlies the flat end of the shank to receive steady support at this point and also that the end of the segmental portion 44 contacts the bottom 64 of the recess 56.

It will be seen that it is a simple matter to remove screws 54 and 62 so that one head may be replaced by another of a different size. The screws can then be reinserted and the head adjusted radially to the proper boring dimension. With the tightening of the screw 62, the head is ready for use. The multiple contact of the radial and axial surface of the boring bar and the head portion 12 together with the guiding rib 46 insures a solid connection between the two parts which can be closely regulated by the graduated head of the screw 54.

We claim:

1. A boring bar for radially adjustable, replaceable and interchangeable heads which comprises a cylindrical shank, having an end surface normal to the axis thereof, and a segmental recess on said shank having axially extending chordal surfaces perpendicular to said end surface and a bottom surface parallel to the end of the shank, a head on said shank comprising a cylindrical disc portion having a shank-facing surface normal to the axis of the shank and contacting the end surface thereof and having a chordal extension with an end surface mating and in contact with the bottom surface of the segmental recess of said shank, said shank-facing surface and said chordal extension end surface being located on opposite sides of the axis of said shank, interfitting means on one of said chordal surfaces of said shank and a complemental surface on said head for permitting transverse motion only of said head on said shank, screw means on said shank for penetrating into said head through chordal surfaces thereof for adjusting said head on said shank, a locking means projecting axially through said head into said shank for clamping the parts in close relation, an axial extension on said head having a recess for a replaceable cutting insert, and a clamp means extending axially on said extension for holding said insert in position.

2. A boring bar for radially adjustable, replaceable and interchangeable heads which comprises a cylindrical shank, having a radial end surface normal to the axis thereof, and a segmental recess on said shank having axially extending chordal surfaces and a radial bottom surface parallel to the end of the shank, a head on said shank comprising a cylindrical disc portion having an elongated slot therethrough with a surface to complement and engage said end surface, and having a chordal extension with a radial end surface mating and engaging with the radial bottom surface of said shank, interfitting means on at least one of said chordal surfaces for permitting transverse motion only of said head on said shank, screw means for penetrating into the other of said chordal surfaces of said head for adjusting said head on said shank, a locking means projecting axially through the elongated slot in said head into said shank for clamping the parts in close relation, an axial extension on said head having a recess for a replaceable cutting insert, and a clamp means extending axially on said extension for holding said insert in position.

3. A boring bar and interchangeable head combination which comprises a shank having, at a working end, a radial surface normal to the axis of the shank, an axial segmental recess terminating in a radial surface axially spaced from and parallel to the end of the shank and completed by chordal surfaces angled with respect to each other, said radial surfaces being generally disposed on opposite sides of the axis of said shank, a head for attachment to and operation with said shank comprising a body having a radial surface to engage the end of said shank and an axial chordal extension on said body having a radial end surface to engage and contact the radial surface of the chordal recess of said shank, and having completing choral surfaces angled to each other, the respective engaging radial surfaces of said shank and said head being adapted to be slidable relative to each other, and a chordal surface on said shank and a chordal surface on said head being also in contacting and sliding engagement, interfitting means on said engaging chordal surfaces for limiting the motion between said shank and said head to a transverse motion in one direction and locking against transverse motion in any other direction, and means for locking said contacting surfaces in tight engagement in a predetermined adjusted position for operation.

References Cited in the file of this patent

UNITED STATES PATENTS

| | | |
|---|---|---|
| 2,649,818 | Kaiser | Aug. 25, 1953 |
| 2,812,672 | Sainati | Nov. 12, 1957 |

FOREIGN PATENTS

| | | |
|---|---|---|
| 11,590 | Great Britain | May 11, 1914 |